(12) United States Patent
Mehta et al.

(10) Patent No.: US 11,381,629 B2
(45) Date of Patent: *Jul. 5, 2022

(54) PASSIVE DETECTION OF FORGED WEB BROWSERS

(71) Applicant: Cequence Security, Inc., Mountain View, CA (US)

(72) Inventors: Shreyans Mehta, Fremont, CA (US); Ameya Talwalkar, Saratoga, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 718 days.

This patent is subject to a terminal disclaimer.

(21) Appl. No.: 16/192,460

(22) Filed: Nov. 15, 2018

(65) Prior Publication Data

US 2019/0089736 A1 Mar. 21, 2019

Related U.S. Application Data

(63) Continuation of application No. 15/069,569, filed on Mar. 14, 2016, now Pat. No. 10,165,004.

(Continued)

(51) Int. Cl.
*H04L 67/02* (2022.01)
*H04L 9/40* (2022.01)

(52) U.S. Cl.
CPC .......... *H04L 67/02* (2013.01); *H04L 63/1408* (2013.01); *H04L 63/1433* (2013.01)

(58) Field of Classification Search
CPC ............................ H04L 63/1408; H04L 67/02

(Continued)

(56) References Cited

U.S. PATENT DOCUMENTS

| 7,380,708 B1 | 6/2008 | Kiliccote |
| 7,784,099 B2 | 8/2010 | Benjamin |

(Continued)

FOREIGN PATENT DOCUMENTS

| JP | 2007-208861 A | 8/2007 |
| JP | 2008-508805 A | 3/2008 |

(Continued)

OTHER PUBLICATIONS

Takahiro Hamada, Yuminobu Igarashi, Hideo Kitazume, Network System for Home Network Security in Cloud, IEICE Technical Report, The Institute of Electronics, Information and Communication Engineers, Sep. 4, 2014, vol. 114, No. 207, p. 105-110.

*Primary Examiner* — Farid Homayounmehr
*Assistant Examiner* — Thanh T Le

(57) ABSTRACT

Techniques to facilitate passive detection of forged web browsers are disclosed herein. In at least one implementation, web traffic between a web server and a client is monitored, and a hypertext transfer protocol (HTTP) header transmitted by the client is processed to determine a type of web browser associated with the client. Attribute data points for the client are generated based on fields in the HTTP request header transmitted by the client and connection behavior of the client with the web server. The attribute data points for the client are then compared with predetermined attribute data points for the type of web browser associated with the client to determine if the client is a genuine web browser of the type of web browser associated with the client.

20 Claims, 5 Drawing Sheets

Related U.S. Application Data

(60) Provisional application No. 62/134,921, filed on Mar. 18, 2015.

(58) Field of Classification Search
USPC .................................................. 726/23
See application file for complete search history.

(56) References Cited

U.S. PATENT DOCUMENTS

| | | |
|---|---|---|
| 7,814,542 B1 | 10/2010 | Day |
| 7,984,500 B1 | 7/2011 | Khanna et al. |
| 8,244,799 B1 * | 8/2012 | Salusky ............... H04L 63/126 709/224 |
| 8,307,099 B1 | 11/2012 | Khanna et al. |
| 8,646,081 B1 | 2/2014 | Xue et al. |
| 8,819,819 B1 | 8/2014 | Johnston et al. |
| 8,856,869 B1 | 10/2014 | Brinskelle |
| 8,893,270 B1 * | 11/2014 | Yang .................. H04L 63/1425 726/25 |
| 9,119,109 B1 | 8/2015 | Dubrovsky et al. |
| 9,231,964 B2 | 1/2016 | Cross et al. |
| 9,348,742 B1 | 5/2016 | Brezinski |
| 9,485,262 B1 | 11/2016 | Kahn et al. |
| 9,646,140 B2 | 5/2017 | Horadan |
| 9,749,305 B1 | 8/2017 | Sharifi Mehr et al. |
| 10,291,589 B1 | 5/2019 | Sharifi Mehr |
| 2001/0039623 A1 | 11/2001 | Shikawa |
| 2002/0099818 A1 * | 7/2002 | Russell .................. H04L 67/02 709/224 |
| 2004/0098609 A1 | 5/2004 | Bracewell et al. |
| 2005/0063377 A1 | 3/2005 | Bryant et al. |
| 2005/0198099 A1 | 9/2005 | Motsinger et al. |
| 2006/0031680 A1 | 2/2006 | Maiman |
| 2006/0117386 A1 | 6/2006 | Gupta et al. |
| 2007/0005648 A1 | 1/2007 | Armanino et al. |
| 2007/0019543 A1 | 1/2007 | Wei et al. |
| 2008/0005782 A1 | 1/2008 | Aziz |
| 2008/0059596 A1 | 3/2008 | Ogawa |
| 2008/0162679 A1 | 7/2008 | Maher et al. |
| 2008/0209541 A1 | 8/2008 | Dequevy |
| 2008/0229109 A1 | 9/2008 | Gantman et al. |
| 2010/0125900 A1 | 5/2010 | Dennerline et al. |
| 2010/0169476 A1 | 7/2010 | Chandrashekar et al. |
| 2010/0191972 A1 | 7/2010 | Kiliccote |
| 2010/0235918 A1 | 9/2010 | Mizrahi et al. |
| 2010/0281539 A1 | 11/2010 | Burns et al. |
| 2011/0013527 A1 | 1/2011 | Varadarajan et al. |
| 2011/0154492 A1 | 6/2011 | Jeong et al. |
| 2011/0185423 A1 | 7/2011 | Sallam |
| 2011/0239300 A1 | 9/2011 | Klein et al. |
| 2011/0269437 A1 | 11/2011 | Marusi et al. |
| 2011/0283361 A1 * | 11/2011 | Perdisci .................. G06F 21/56 726/24 |
| 2012/0144026 A1 | 6/2012 | Conlon et al. |
| 2012/0240185 A1 | 9/2012 | Kapoor et al. |
| 2012/0291129 A1 * | 11/2012 | Shulman ............ H04L 63/1433 726/23 |
| 2013/0031621 A1 | 1/2013 | Jenne et al. |
| 2013/0036472 A1 | 2/2013 | Aziz |
| 2013/0055375 A1 | 2/2013 | Cine et al. |
| 2013/0097699 A1 | 4/2013 | Balupari et al. |
| 2013/0195457 A1 | 8/2013 | Levy et al. |
| 2013/0227674 A1 | 8/2013 | Anderson |
| 2013/0315241 A1 | 11/2013 | Kamat et al. |
| 2014/0101764 A1 * | 4/2014 | Montoro ............... H04L 63/145 726/23 |
| 2014/0189864 A1 | 7/2014 | Wang et al. |
| 2014/0283067 A1 * | 9/2014 | Call .................... H04L 63/1416 726/23 |
| 2015/0067472 A1 | 3/2015 | Chen |
| 2015/0096023 A1 | 4/2015 | Mesdaq et al. |
| 2015/0180893 A1 * | 6/2015 | Im ....................... H04L 63/1425 726/23 |
| 2015/0180898 A1 | 6/2015 | Liljenstram et al. |
| 2016/0021136 A1 | 1/2016 | McGloin et al. |
| 2016/0110549 A1 | 4/2016 | Schmitt |
| 2016/0149953 A1 | 5/2016 | Hidayat |
| 2016/0173526 A1 | 6/2016 | Kasman et al. |
| 2016/0197947 A1 | 7/2016 | Im et al. |
| 2016/0241560 A1 * | 8/2016 | Reshadi ................. H04L 67/10 |
| 2016/0241592 A1 | 8/2016 | Kurkure et al. |
| 2016/0308898 A1 | 10/2016 | Teeple et al. |
| 2017/0041334 A1 | 2/2017 | Kahn et al. |
| 2017/0078328 A1 | 3/2017 | McGinnity et al. |
| 2017/0134397 A1 | 5/2017 | Dennison et al. |
| 2018/0026999 A1 | 1/2018 | Ruvio et al. |
| 2018/0115571 A1 | 4/2018 | Kahn et al. |
| 2018/0260565 A1 * | 9/2018 | Wang .................. H04L 63/1483 |

FOREIGN PATENT DOCUMENTS

| | | |
|---|---|---|
| JP | 2011-503715 A | 1/2011 |
| WO | 2014/021863 A1 | 2/2014 |
| WO | 2014/042645 A1 | 3/2014 |

\* cited by examiner

EXEMPLARY USER-AGENT HEADER FIELDS FROM VARIOUS WEB BROWSERS

- Chrome 41
  - Mozilla/5.0 (Windows NT 6.1) AppleWebKit/537.36 (KHTML, like Gecko) Chrome/41.0.2228.0 Safari/537.36
  - Mozilla/5.0 (Macintosh; Intel Mac OS X 10_10_1) AppleWebKit/537.36 (KHTML, like Gecko) Chrome/41.0.2227.1 Safari/537.36
  - Mozilla/5.0 (X11; Linux x86_64) AppleWebKit/537.36 (KHTML, like Gecko) Chrome/41.0.2227.0 Safari/537.36
  - Mozilla/5.0 (Windows NT 6.1; WOW64) AppleWebKit/537.36 (KHTML, like Gecko) Chrome/41.0.2227.0 Safari/537.36
  - Mozilla/5.0 (Windows NT 6.3; WOW64) AppleWebKit/537.36 (KHTML, like Gecko) Chrome/41.0.2226.0 Safari/537.36
  - Mozilla/5.0 (Windows NT 6.4; WOW64) AppleWebKit/537.36 (KHTML, like Gecko) Chrome/41.0.2225.0 Safari/537.36
  - Mozilla/5.0 (Windows NT 6.3; WOW64) AppleWebKit/537.36 (KHTML, like Gecko) Chrome/41.0.2225.0 Safari/537.36
  - Mozilla/5.0 (Windows NT 5.1) AppleWebKit/537.36 (KHTML, like Gecko) Chrome/41.0.2224.3 Safari/537.36

- Internet Explorer 10.0
  - Mozilla/5.0 (compatible; MSIE 10.0; Windows NT 6.1; WOW64; Trident/6.0)
  - Mozilla/5.0 (compatible; MSIE 10.0; Windows NT 6.1; Trident/6.0)
  - Mozilla/5.0 (compatible; MSIE 10.0; Windows NT 6.1; Trident/5.0)
  - Mozilla/5.0 (compatible; MSIE 10.0; Windows NT 6.1; Trident/4.0; InfoPath.2; SV1; .NET CLR 2.0.50727; WOW64)

FIGURE 4

PASSIVE DETECTION OF FORGED WEB BROWSERS

RELATED APPLICATIONS

This application is a continuation of, and claims priority to U.S. patent application Ser. No. 15/069,569, entitled "PASSIVE DETECTION OF FORGED WEB BROWSERS," filed Mar. 14, 2016, which also claims the benefit of, and priority to, U.S. Provisional Patent Application No. 62/134,921, entitled "PASSIVE DETECTION OF FORGED WEB BROWSERS", filed Mar. 18, 2015, each of which is hereby incorporated by reference in their entirety.

TECHNICAL BACKGROUND

Various kinds of automated attacks are possible on web servers that provide web services, such as using stolen credentials to fraudulently access the service, brute-force attacks that try several username and password combinations to gain access, registering fake accounts, scraping websites to harvest web data, and others. Such velocity attacks typically require a large number of transactions with the web service in a very short period of time, and commonly-used web browsers are prohibitively slow for such large-scale and high-speed transactions. Instead, attackers use a wide variety of attack tools, ranging from simple shell scripts to sophisticated custom tools designed to speed up transactions.

Unfortunately, attack tools are often designed to deceive a web service into believing that the traffic is actually originating from a prevalent web browser. To achieve this subterfuge, the User-Agent header of a well-known browser is typically forged in the hypertext transfer protocol (HTTP) request header of traffic originating from a malicious attack tool. Because the User-Agent string exactly matches one of the well-known web browsers, the web service and any attack-prevention techniques that rely on identifying the User-Agent string are unable to differentiate between a real web browser and a forgery, leaving the web service vulnerable to exploitation by malicious individuals employing attack tools to access the service.

Overview

A method to facilitate passive detection of forged web browsers is disclosed. The method comprises monitoring web traffic between a web server and a client. The method further comprises processing a hypertext transfer protocol (HTTP) header transmitted by the client to determine a type of web browser associated with the client. The method further comprises generating attribute data points for the client based on fields in the HTTP request header transmitted by the client and connection behavior of the client with the web server. The method further comprises comparing the attribute data points for the client with predetermined attribute data points for the type of web browser associated with the client to determine if the client is a genuine web browser of the type of web browser associated with the client.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

FIG. 4 illustrates exemplary User-Agent header fields for various web browsers.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Some security technologies detect a forged browser by actively injecting JavaScript code or modifying the pages being served by the web service as part of the web server's response to client requests. The web server can then use the results of the JavaScript execution to determine whether or not the client making the requests is actually a genuine web browser. However, this technique requires integration with the web service or being inline with the web service, which may involve additional development on the web service and may adversely affect its performance due to active modification of the pages being served. The following disclosure enables passive detection of genuine or forged web browser activity without any active page modification.

Implementations are disclosed herein to facilitate passive detection of forged web browsers. In at least one implementation, web traffic is monitored between a web server and a client system. A hypertext transfer protocol (HTTP) header transmitted by the client is processed to determine a type of web browser that the client purports to be, and attribute data points are generated for the client based on fields in the HTTP request header transmitted by the client, which may include the field order, available browser capabilities, supported protocols, and any other information included in the HTTP request header. The connection behavior of the client with the web server is also monitored to generate additional attribute data points. The attribute data points for the client are then compared with predetermined and known attribute data points for the type of web browser that the client lists in its HTTP request header to determine whether the client is a genuine or forged web browser.

Figure 1:
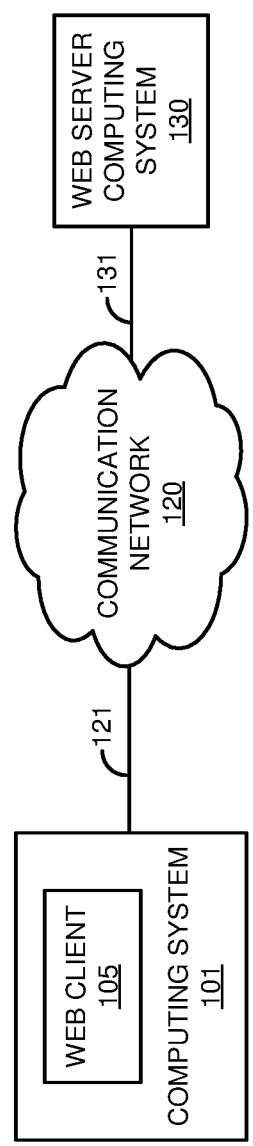
FIG. 1 is a block diagram that illustrates a communication system.

FIG. 1 is a block diagram that illustrates communication system 100. Communication system 100 includes computing system 101, communication network 120, and web server computing system 130. Computing system 101 include web client 105. Computing system 101 and communication network 120 communicate over communication link 121. Communication network 120 and web server computing system 130 are in communication over communication link 131.

In operation, computing system 101 executes web client 105 which submits an HTTP request to web server 130. Various aspects of the HTTP request can then be analyzed by web server 130 or some other processing system to determine attribute data points for client 105 that describe the particular form and content of the HTTP request, connection behavior and interactions with server 130 during the HTTP request, and any other attributes that uniquely identify the HTTP request from web client 105. Presence or absence of a combination of these attributes can be used to determine whether the client is a genuine or forged web browser. An exemplary implementation for passively detecting forged web browsers will now be discussed with respect to FIG. 2.

Figure 2:
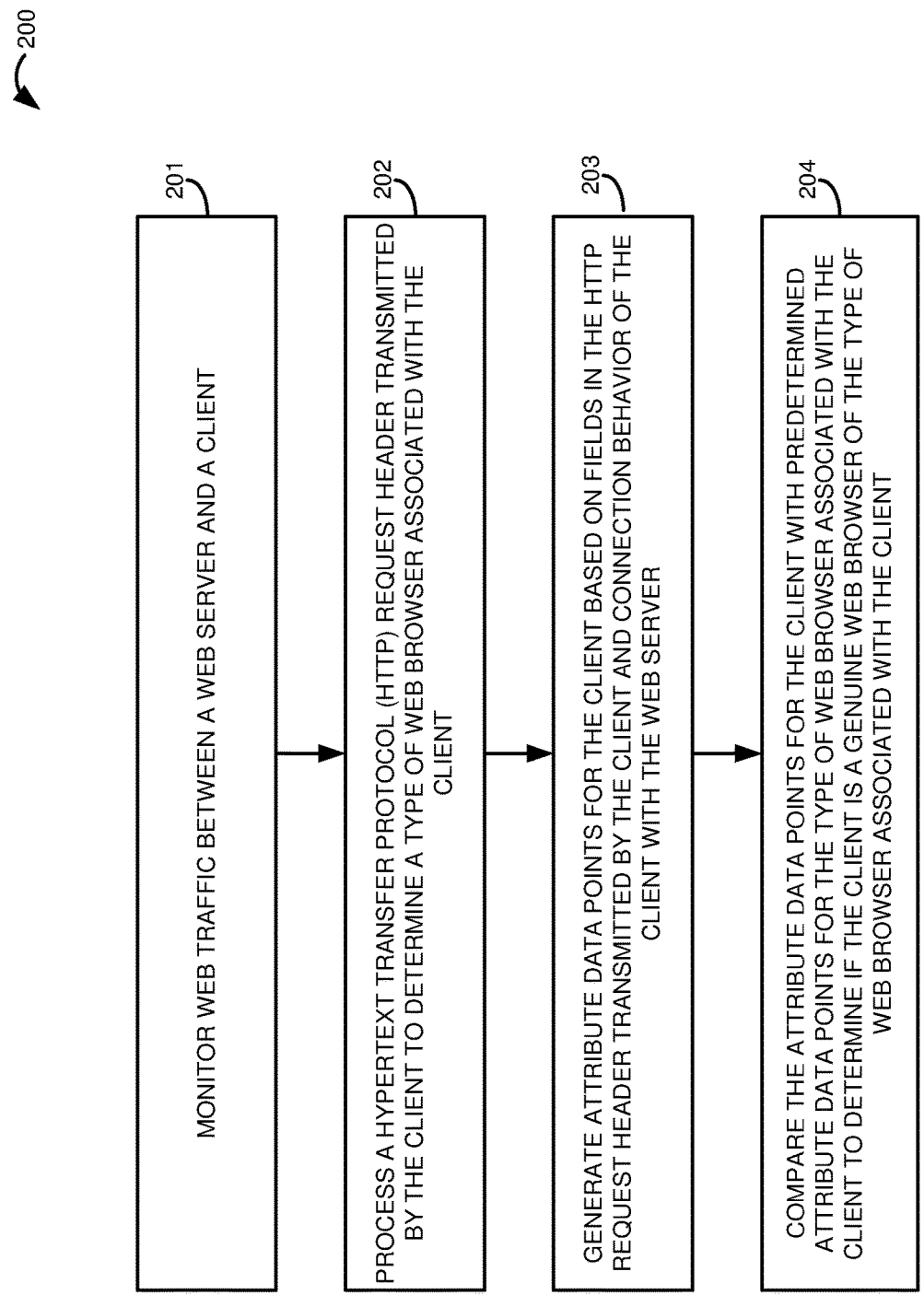
FIG. 2 is a flow diagram that illustrates an operation of the communication system.

FIG. 2 is a flow diagram that illustrates an operation 200 of communication system 100. The operation 200 shown in FIG. 2 may also be referred to as detection process 200 herein. The steps of the operation are indicated below parenthetically. The following discussion of operation 200 will proceed with reference to web client 105 and web server 130 of FIG. 1 in order to illustrate its operations, but note that the details provided in FIG. 1 are merely exemplary and not intended to limit the scope of process 200 to the specific implementation shown in FIG. 1.

Operation 200 may be employed by web server computing system 130 to facilitate passive detection of forged web browsers. As shown in the operational flow of FIG. 2, web server computing system 130 monitors web traffic between web server 130 and web client 105 (201). Web client 105 could comprise any application that interacts with web server 130, such as a genuine web browser, attack tools such as a script or bot, or any other software program. The web service provided by web server 130 could comprise any service that may be available over a communication network, such as streaming media, email, financial services, e-commerce, social media, online gaming services, or any other web service, including combinations thereof. In this example, the web service being monitored is also hosted by server computing system 130, although the web service could be provided by a different computing system in some implementations. The web traffic monitored between web server 130 and web client 105 includes hypertext transfer protocol (HTTP) requests transmitted by web client 105 and HTTP responses from web server 130, which typically include payload data requested by client 105.

Web server computing system 130 processes an HTTP request header transmitted by web client 105 to determine a type of web browser associated with client 105 (202). Typically, HTTP requests transmitted by web client 105 include header information that may indicate a browser type, such as the browser name, version number, and other identifying information associated with the browser. For example, whether or not web client 105 is a genuine browser or a malicious attack tool masquerading as a browser, client 105 will typically transmit an HTTP request header having a User-Agent header field that purports to originate from some type of known web browser. Web server computing system 130 thus processes the User-Agent header field of the HTTP request header transmitted by web client 105 to determine the type of web browser associated with client 105.

Web server computing system 130 generates attribute data points for web client 105 based on fields in the HTTP request header transmitted by client 105 and connection behavior of the client 105 with the web server 130 (203). The attribute data points for web client 105 describe the unique form and content of the HTTP request, along with the behavior of client 105 when interacting with web server 130. For example, an HTTP request sent by web client 105 may include multiple header fields such as Host, Accept, and Accept-Encoding, among others. Some of these fields are optional and therefore will not always be included in an HTTP request header. Thus, the particular fields that web client 105 includes in the HTTP request header may be factored in when generating the attribute data points for web client 105. In other words, the attribute data points could be partly based on which of the fields are included in the HTTP request header. Further, different web browser and even different versions of the same web browser may arrange these fields in different orders in the header. Thus, in some implementations, web server 130 could generate the attribute data points for client 105, in part, based on an order or arrangement of the fields in the HTTP request header transmitted by the client 105.

The values in the HTTP header fields are also driven by the capabilities of the web browsers and their implementation preferences, and web server 130 could generate the attribute data points for web client 105 based on capabilities supported by client 105 as indicated in the fields in the HTTP request header. For example, some browsers choose to expose the Accept-Encoding header field as one or more values from gzip, compress, deflate, and the like, depending on the capabilities available in the browser on a given platform, while others may choose to completely forego including the Accept-Encoding header field altogether. The protocols, languages, and other features that the browser supports may also be listed in the HTTP header fields, such as support for various scripting languages, Flash® media, compression algorithms, and others. Moreover, as browsers release new versions, they include newer capabilities as well. For example, a default protocol version (i.e., 1.0, 1.1, 2.0) to use for the request may be continually updated in newer release versions of a browser, so web server 130 could generate attribute data points for client 105 based on the default protocol version indicated in the HTTP request header. Further, new fields like Do Not Track (DNT) may be introduced in newer versions of a browser that were not present in older versions. Any of this kind of capability information that may be included in the HTTP request header could be used by web server 130 to generate attribute data points for web client 105. In addition, certain behavior of web client 105 can be observed, including how client 105 responds to requests from web server 130, such as observing how client 105 responds to a request from web server 130 to fall back to an older protocol version.

Web server 130 also monitors the connection behavior of web client 105 with web server 130 for use in generating the attribute data points for client 105. Web browsers may interact with a web server in different ways. For example, some browsers choose to send multiple HTTP requests in the same transmission control protocol (TCP) connection, while others create a new connection for every request. Some browsers send multiple requests in the same connection even before they start receiving responses from the server, while others wait to send subsequent requests in the same connection until a response to an initial request on that connection is returned. Thus, in some implementations, web server 130 could generate the attribute data points for client 105, in part, based on whether or not client 105 sends multiple HTTP requests over a same connection to web server 130.

In certain cases, browsers may choose to keep a connection or multiple connections open for a period of time, even if there are no active requests or responses in transit. In other words, the length of time that a connection persists, even though no data may be flowing over that connection, can differ between different types of web browsers. Accordingly, the attribute data points for web client 105 may be generated based on a length of time that client 105 maintains a connection with web server 130. Other behavior of web client 105 could be determined as well, such as the order and manner in which client 105 parses the hypertext markup language (HTML) and other code when fetching a web page. For example, when parsing HTML, some browsers will parse hyperlinks and other textual content in a different way than images or video, such as fetching all images first, or processing all JavaScript code first before fetching images, or fetching images with a different connection than other page content, and any other nuances in HTML parsing and page fetching. Any of the above information in the HTTP header, connection behavior, and other data that can be observed from the interactions of web client 105 with web server 130 can be used to generate the attribute data points for client 105 that effectively provides a unique signature of how client 105 is operating.

Web server computing system 130 compares the attribute data points for web client 105 with predetermined attribute data points for the type of web browser associated with client 105 to determine if client 105 is a genuine web browser of the type of web browser associated with client 105 (204). Typically, the predetermined attribute data points for well-known browsers and their various release versions may be generated through observation and stored in a database for use in the comparison. An exemplary implementation of how these predetermined attribute data points may be generated for various known web browsers is discussed below with respect to FIG. 3. These predetermined attribute data points can then be used to positively identify the corresponding browser version from which it was derived. Thus, if the attribute data points that are determined for web browser 105 match the predetermined attribute data points for the type of web browser that client 105 purports to be according to the User-Agent string in its HTTP request headers, then web server 130 can positively determine that client 105 is a genuine web browser and not a malicious attack tool masquerading as that browser.

Advantageously, web server computing system 130 is able to passively monitor web traffic and interactions between web client 105 and web server 130 to generate attribute data points for client 105. By comparing similar predetermined data points for the type of web browser listed in the User-Agent string of the HTTP request header transmitted by client 105 to the attribute data points generated for client 105, web server 130 is capable of determining whether client 105 is a genuine or forged web browser. Accordingly, by detecting and eliminating illegitimate requests from forged web browsers, the techniques described herein provide the technical advantage of reducing the load on the processor, network components, and other elements of web server 130, while also safeguarding the information of users of the web service. In this manner, web server 130 can positively identify attempts at web browser forgery and effectively thwart attacks on the web service from these kinds of attack tools.

Figure 3:
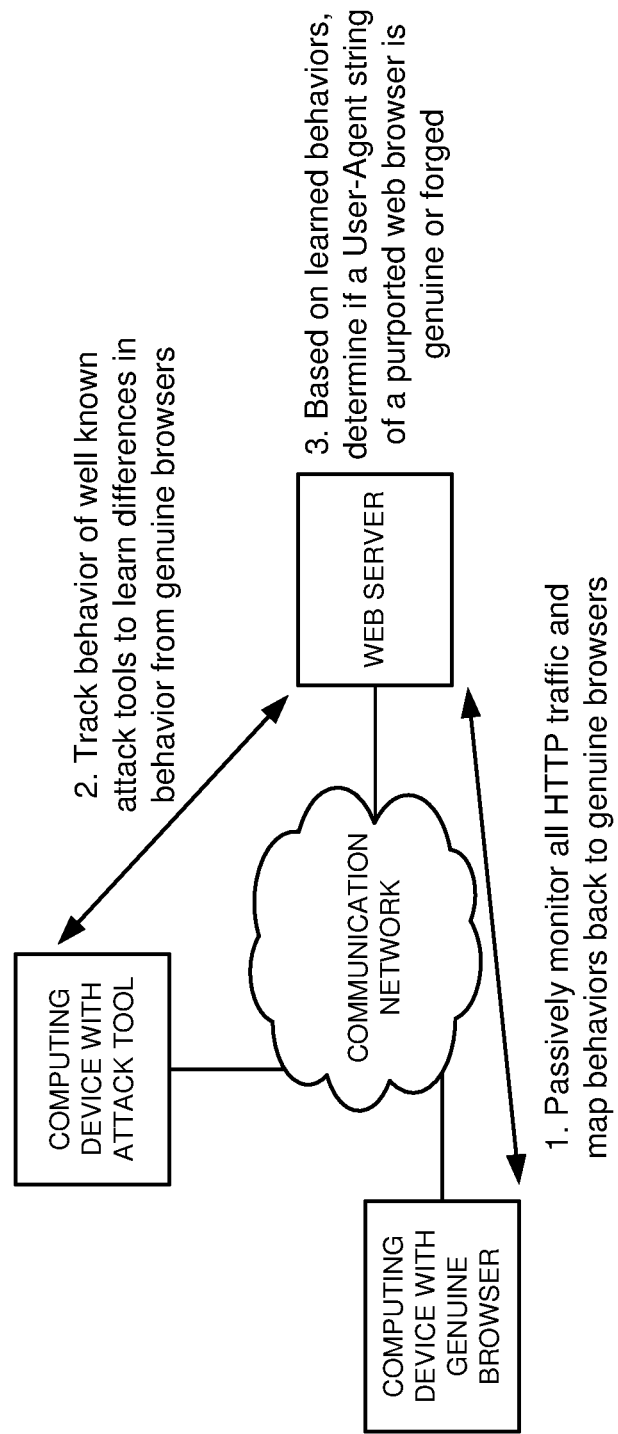
FIG. 3 is a block diagram that illustrates an operation of a communication system in an exemplary embodiment.

Referring now to FIG. 3, a block diagram is shown that illustrates an operation of communication system 300 in an exemplary embodiment. The techniques described in FIG. 3 could be executed by the elements of communication system 100 and could be combined with operation 200 of FIG. 2 in some implementations. Communication system 300 includes a computing device with a genuine web browser, a computing device with a known attack tool, a communication network, and a web server. The computing devices and the web server communicate over the communication network.

Every well-known web browser exposes the Browser Name, Version, and Platform combination through the User-Agent header field. FIG. 4 provides a few examples of this User-Agent field on various different browsers. Attack tools often copy and use the User-Agent string from prevalent web browsers in their own HTTP request headers to disguise themselves as those browsers. However, such attack tools fail to replicate all of the behavioral characteristics of the real web browsers they are trying to emulate, and these incongruities can be used to detect applications, scripts, and other tools that are trying to hold themselves out as prevalent browsers.

In this example, communication system 300 represents a trusted learning environment where the traffic being sent between the computing devices and the web server is controlled. This environment can be used to automatically learn all of the subtle behavioral differences for every well-known web browser and its various incremental version releases. In particular, a known web browser to be analyzed is loaded onto a computing device and controlled traffic is exchanged with the web server while monitoring all of the default behavior of the browser. The information monitored includes the various fields in the HTTP request headers sent by the browser, including which fields are provided, the order that the fields are presented, which protocols, languages, tools, and other features the browser supports, and any other information in the HTTP headers that may be uniquely associated with the web browser. Other behavior is also tested and observed, such as the protocol version (i.e., HTTP version) that the browser uses to perform the initial handshake with the web server, or the manner in which the web browser responds to a request from the web server to fall back to an older protocol version than the browser used initially.

The connection behavior of the browser is also recorded, such as whether the browser sends multiple HTTP requests in the same connection or opens a new connection for each request. Other connectivity behavior that could be tested is whether the browser sends multiple requests in the same connection before ever receiving a response from the web server, or whether the browser waits for a response to an initial request before sending subsequent requests. The length of time that the connection or connections persist is also measured, which may remain open for some period of time even though no data is flowing between the endpoints. The manner and order in which elements of a web page (i.e., text, hyperlinks, images, videos, advertisements, JavaScript, and other page content) are fetched by the browser when parsing the HTML code of a web page are also tracked, including whether or not the browser creates new connections to fetch each of the various different page elements.

In this manner, all HTTP Request and Response traffic is passively monitored, and these static and dynamic behaviors are then mapped back to the actual web browsers under their respective User-Agent string and stored as attribute data points for later comparison. New behaviors of new versions of prevalent web browsers are continuously learned in this environment as they are released, ensuring the database remains current, relevant, and effective. New behaviors of web browsers can also be added to their attribute data points as they are learned, which can be observed from the browsers' behavior as they access different websites, different pages and file types (i.e., HTML, images, text, scripts, and others), and make different types of HTTP requests (i.e., GET, HEAD, POST, and the like).

In addition to observing the various different web browser interactions, attack tools are also run in the trusted test environment of communication system 300. In this case, even though the attack tools may be fraudulently manipulating the User-Agent string, this controlled test environment provides for tracking the traffic from the attack tools to learn their behavior and observe how it differs from the genuine web browsers they are pretending to be. This information can aid in identifying when a particular attack tool is being used, which helps strengthen the determination that the traffic is not coming from a genuine web browser. After amassing the data as described above for all well-known web browsers and their various release versions, the system can operate in an untrusted environment with a mixture of real and forged browsers and monitor the clients' behaviors. Based on the learned behaviors, a determination can be made as to whether or not a purported browser is a genuine browser of the type specified in its User-Agent string. If there is a deviation from the learned behavior, that browser can be marked as a forgery.

The security techniques described above help to ensure that a web service is only accessed by legitimate web browsers by passively identifying attempts to access the web service with attack tools masquerading as real browsers. Any suspicious activity that deviates from the learned behavior of a particular web browser can be flagged and blocked, thereby providing improved defenses against malicious users.

Now referring back to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Web server computing system 130 may be representative of any computing apparatus, system, or systems on which the techniques disclosed herein or variations thereof may be suitably implemented. Web server computing system 130 comprises a processing system and communication transceiver. Web server computing system 130 may also include other components such as a router, server, data storage system, and power supply. Web server computing system 130 may reside in a single device or may be distributed across multiple devices. Web server computing system 130 may be a discrete system or may be integrated within other systems, including other systems within communication system 100. Some examples of web server computing system 130 include desktop computers, server computers, cloud computing platforms, and virtual machines, as well as any other type of computing system, variation, or combination thereof. In some examples, web server computing system 130 could comprise a network switch, router, switching system, packet gateway, network gateway system, Internet access node, application server, database system, service node, firewall, or some other communication system, including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format, including combinations thereof. Communication links 121 and 131 could be direct links or may include intermediate networks, systems, or devices.

Figure 5:
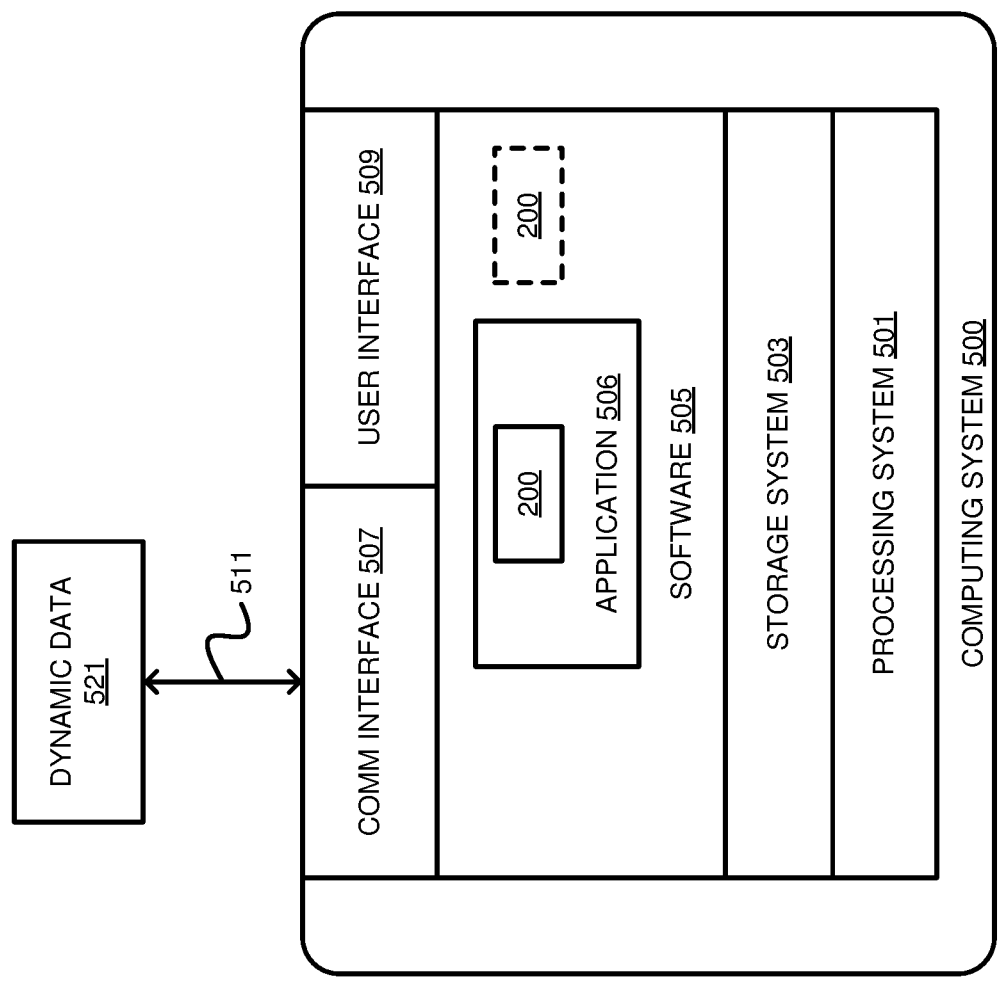
FIG. 5 is a block diagram that illustrates a computing system.

Referring now to FIG. 5, a block diagram that illustrates computing system 500 in an exemplary implementation is shown. Computing system 500 provides an example of web server 130, although server 130 could use alternative configurations. Computing system 500 could also provide an example of computing system 101, although system 101 could use alternative configurations. Computing system 500 includes processing system 501, storage system 503, software 505, communication interface 507, and user interface 509. Software 505 includes application 506 which itself includes detection process 200. Detection process 200 may optionally be implemented separately from application 506.

Computing system 500 may be representative of any computing apparatus, system, or systems on which application 506 and detection process 200 or variations thereof may be suitably implemented. Examples of computing system 500 include mobile computing devices, such as cell phones, tablet computers, laptop computers, notebook computers, and gaming devices, as well as any other type of mobile computing devices and any combination or variation thereof. Note that the features and functionality of computing system 500 may apply as well to desktop computers, server computers, and virtual machines, as well as any other type of computing system, variation, or combination thereof.

Computing system 500 includes processing system 501, storage system 503, software 505, communication interface 507, and user interface 509. Processing system 501 is operatively coupled with storage system 503, communication interface 507, and user interface 509. Processing system 501 loads and executes software 505 from storage system 503. When executed by computing system 500 in general, and processing system 501 in particular, software 505 directs computing system 500 to operate as described herein for web server 130 for execution of detection process 200 or variations thereof. Computing system 500 may optionally include additional devices, features, or functionality not discussed herein for purposes of brevity.

Referring still to FIG. 5, processing system 501 may comprise a microprocessor and other circuitry that retrieves and executes software 505 from storage system 503. Processing system 501 may be implemented within a single processing device but may also be distributed across multiple processing devices or sub-systems that cooperate in executing program instructions. Examples of processing system 501 include general purpose central processing units, application specific processors, and logic devices, as well as any other type of processing device, combinations, or variations thereof.

Storage system 503 may comprise any computer-readable media or storage media readable by processing system 501 and capable of storing software 505. Storage system 503 may include volatile and nonvolatile, removable and non-removable media implemented in any method or technology for storage of information, such as computer-readable instructions, data structures, program modules, or other data. Storage system 503 may be implemented as a single storage device but may also be implemented across multiple storage devices or sub-systems co-located or distributed relative to each other. Storage system 503 may comprise additional elements, such as a controller, capable of communicating with processing system 501. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, processing system 501 loads and executes portions of software 505, such as application 506 and/or detection process 200, to passively detect forged web browsers. Software 505 may be implemented in program instructions and among other functions may, when executed by computing system 500 in general or processing system 501 in particular, direct computing system 500 or processing system 501 to monitor web traffic between a web server and a client and process a hypertext transfer protocol (HTTP) header transmitted by the client to determine a type of web browser associated with the client. Software 505 may further direct computing system 500 or processing system 501 to generate attribute data points for the client based on fields in the HTTP request header transmitted by the client and connection behavior of the client with the web server, and compare the attribute data points for the client with predetermined attribute data points for the type of web browser associated with the client to determine if the client is a genuine web browser of the type of web browser associated with the client.

Software 505 may include additional processes, programs, or components, such as operating system software or other application software. Examples of operating systems include Windows®, iOS®, and Android®, as well as any other suitable operating system. Software 505 may also comprise firmware or some other form of machine-readable processing instructions executable by processing system 501.

In general, software 505 may, when loaded into processing system 501 and executed, transform computing system 500 overall from a general-purpose computing system into a special-purpose computing system customized to facilitate passive detection of forged web browsers as described herein for each implementation. For example, encoding software 505 on storage system 503 may transform the physical structure of storage system 503. The specific transformation of the physical structure may depend on various factors in different implementations of this description. Examples of such factors may include, but are not limited to the technology used to implement the storage media of storage system 503 and whether the computer-storage media are characterized as primary or secondary storage.

In some examples, if the computer-storage media are implemented as semiconductor-based memory, software 505 may transform the physical state of the semiconductor memory when the program is encoded therein. For example, software 505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 500 is generally intended to represent a computing system with which software 505 is deployed and executed in order to implement application 506, detection process 200, and variations thereof. However, computing system 500 may also represent any computing system on which software 505 may be staged and from where software 505 may be distributed, transported, downloaded, or otherwise provided to yet another computing system for deployment and execution, or yet additional distribution. For example, computing system 500 could be configured to deploy software 505 over the internet to one or more client computing systems for execution thereon, such as in a cloud-based deployment scenario.

Communication interface 507 may include communication connections and devices that allow for communication between computing system 500 and other computing systems (not shown) or services, over a communication network 511 or collection of networks. In some implementations, communication interface 507 receives dynamic data 521 over communication network 511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 509 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 509. In some examples, user interface 509 could include a touch screen capable of displaying a graphical user interface that also accepts user inputs via touches on its surface. The aforementioned user input devices are well known in the art and need not be discussed at length here. User interface 509 may also include associated user interface software executable by processing system 501 in support of the various user input and output devices discussed above. Separately or in conjunction with each other and other hardware and software elements, the user interface software and devices may provide a graphical user interface, a natural user interface, or any other kind of user interface. User interface 509 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate passive detection of forged web browsers, the method comprising:
    processing a hypertext transfer protocol (HTTP) request header transmitted by a client to a web server to determine a type of web browser associated with the client;
    monitoring behavior of the client in parsing hypertext markup language and other code when fetching a webpage from the web server, including identifying an order in which the client fetches elements of the webpage;
    generating attribute data points for the client based on fields in the HTTP request header transmitted by the client, the behavior of the client in parsing the hypertext markup language and other code, and connection behavior of the client with the web server;
    comparing the attribute data points for the client with predetermined attribute data points for the type of web browser associated with the client to determine if the client is a genuine web browser of the type of web browser associated with the client; and
    eliminating any web traffic from the client upon determining that the type of web browser associated with the client is not a genuine web browser.

2. The method of claim 1, wherein processing the HTTP request header transmitted by the client to determine the type of web browser associated with the client includes processing a User-Agent header field of the HTTP request header transmitted by the client to determine the type of web browser associated with the client.

3. The method of claim 1, wherein generating the attribute data points for the client based on the fields in the HTTP request header transmitted by the client includes generating the attribute data points for the client based on which of the fields are included in the HTTP request header or generating the attribute data points for the client based on an order of the fields in the HTTP request header transmitted by the client.

4. The method of claim 1, wherein generating the attribute data points for the client based on the connection behavior of the client with the web server includes generating the attribute data points for the client based on whether or not the client sends multiple HTTP requests over a same connection to the web server.

5. The method of claim 1, wherein generating the attribute data points for the client based on the connection behavior of the client with the web server includes generating the attribute data points for the client based on a length of time that the client maintains a connection with the web server.

6. The method of claim 1, wherein generating the attribute data points for the client based on the fields in the HTTP request header transmitted by the client includes generating the attribute data points for the client based on capabilities supported by the client as indicated in the fields in the HTTP request header.

7. The method of claim 1, further comprising running an attack tool, in a trusted test environment, to manipulate the HTTP request header transmitted by the client or connection behavior of the client with the web server and learning differences from the genuine web browser.

8. The method of claim 7, wherein comparing the attribute data points for the client with predetermined attribute data points for the type of web browser associated with the client also includes identifying a particular attack tool based on the differences learned from the genuine web browser.

9. The method of claim 1, wherein identifying the order in which the client fetches the elements of the webpage comprises identifying an order in which the client fetches images and processes JavaScript code.

10. The method of claim 1, wherein generating the attribute data points for the client based on the connection behavior of the client with the web server comprises generating the attribute data points for the client based on a response of the client to a request from the web server to fall back to an older protocol version.

11. The method of claim 1, further comprising evaluating new versions of web browsers to identify the predetermined attribute data points indicative of genuine web browsers by:
    loading a known web browser onto a computing device;
    exchanging traffic between the known web browser and with the web server in a controlled manner;
    monitoring behavior of the known web browser during the traffic exchange with the web server,
    wherein the behavior of the known web browser that is monitored includes which fields are provided in an HTTP request header, an order of the fields in the HTTP request header, protocol version that the known web browser used to perform an initial handshake with the web server, and response to a request from the web server to fall back to an older protocol version than the known web browser used initially; and
    developing the predetermined attribute data points for the known web browser.

12. An apparatus comprising:
    one or more non-transitory computer-readable storage media; and
    program instructions stored on the one or more non-transitory computer-readable storage media that, when executed by a computing system, direct the computing system to at least:

monitor web traffic between a web server and a client;

process a hypertext transfer protocol (HTTP) request header transmitted by the client to determine a type of web browser associated with the client;

monitor behavior of the client in parsing hypertext markup language and other code when fetching a webpage from the web server, including identifying an order in which the client fetches elements of the webpage;

generate attribute data points for the client based on fields in the HTTP request header transmitted by the client, the behavior of the client in parsing the hypertext markup language and other code, and connection behavior of the client with the web server;

compare the attribute data points for the client with predetermined attribute data points for the type of web browser associated with the client to determine if the client is a genuine web browser of the type of web browser associated with the client; and eliminate any web traffic from the client upon determining that the type of web browser associated with the client is not a genuine web browser.

13. The apparatus of claim 12 wherein the program instructions, to direct the computing system to process the HTTP request header transmitted by the client to determine the type of web browser associated with the client, direct the computing system to process a User-Agent header field of the HTTP request header transmitted by the client to determine the type of web browser associated with the client.

14. The apparatus of claim 12 wherein the program instructions, to direct the computing system to generate the attribute data points for the client based on the fields in the HTTP request header transmitted by the client, direct the computing system to generate the attribute data points for the client based on which of the fields are included in the HTTP request header or based on an order of the fields in the HTTP request header transmitted by the client.

15. The apparatus of claim 12 wherein the program instructions, to direct the computing system to generate the attribute data points for the client based on the connection behavior of the client with the web server, direct the computing system to generate the attribute data points for the client based on whether or not the client sends multiple HTTP requests over a same connection to the web server.

16. The apparatus of claim 12 wherein the program instructions, to direct the computing system to generate the attribute data points for the client based on the connection behavior of the client with the web server, direct the computing system to generate the attribute data points for the client based on a length of time that the client maintains a connection with the web server.

17. The apparatus of claim 12 wherein the program instructions, to direct the computing system to generate the attribute data points for the client based on the fields in the HTTP request header transmitted by the client, direct the computing system to generate the attribute data points for the client based on capabilities supported by the client as indicated in the fields in the HTTP request header.

18. A system comprising means for monitoring web traffic between a web server and a client;

means for processing a hypertext transfer protocol (HTTP) request header transmitted by the client to determine a type of web browser associated with the client;

means for monitoring behavior of the client in parsing hypertext markup language and other code when fetching a webpage from the web server, including identifying an order in which the client fetches elements of the webpage;

means for generating attribute data points for the client based on fields in the HTTP request header transmitted by the client, the behavior of the client in parsing the hypertext markup language and other code, and connection behavior of the client with the web server;

means for comparing the attribute data points for the client with predetermined attribute data points for the type of web browser associated with the client to determine if the client is a genuine web browser of the type of web browser associated with the client; and means for eliminating any web traffic from the client upon determining that the type of web browser associated with the client is not a genuine web browser.

19. The system of claim 18 further comprising:

means for processing the HTTP request header transmitted by the client to determine the type of web browser associated with the client, or means for processing a User-Agent header field of the HTTP request header transmitted by the client to determine the type of web browser associated with the client.

20. The system of claim 18 further comprising:

means for generating the attribute data points for the client based on the fields in the HTTP request header transmitted by the client; or means for generating the attribute data points for the client based on which of the fields are included in the HTTP request header, an order of the fields in the HTTP request header transmitted by the client, whether or not the client sends multiple HTTP requests over a same connection to the web server, or a length of time that the client maintains a connection with the web server.

* * * * *